(12) United States Patent
Kjellman

(10) Patent No.: US 12,478,812 B2
(45) Date of Patent: Nov. 25, 2025

(54) PULL STATION RELEASE MECHANISM

(71) Applicant: KIDDE-FENWAL, LLC, Ashland, MA (US)

(72) Inventor: Thomas Carl Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 398 days.

(21) Appl. No.: 18/087,103

(22) Filed: Dec. 22, 2022

(65) Prior Publication Data

US 2023/0211193 A1    Jul. 6, 2023

Related U.S. Application Data

(60) Provisional application No. 63/296,340, filed on Jan. 4, 2022.

(51) Int. Cl.
  *A62C 3/00*      (2006.01)
  *A62C 99/00*    (2010.01)

(52) U.S. Cl.
  CPC ............ *A62C 3/006* (2013.01); *A62C 99/009* (2013.01)

(58) Field of Classification Search
  CPC ........ A62C 3/006; A62C 99/009; G05G 7/00; F16H 55/36; F16H 55/52
  USPC ................. 169/5, 9, 45–47, 65; 74/469, 491
  See application file for complete search history.

(56) References Cited

U.S. PATENT DOCUMENTS

| | | | | |
|---|---|---|---|---|
| 3,448,808 A | * | 6/1969 | Olson | A62C 3/006 169/65 |
| 3,463,233 A | * | 8/1969 | Haessler | F24C 15/2021 169/65 |
| 3,515,218 A | | 6/1970 | Gardner et al. | |
| 5,297,636 A | | 3/1994 | North | |
| 6,286,604 B1 | * | 9/2001 | Ou | A62C 37/46 169/65 |
| 2023/0126593 A1 | * | 4/2023 | Bouchard | G05G 7/00 74/491 |

OTHER PUBLICATIONS

Extended European Search Report for European Application No. 23150159.4; Report Mail Date May 25, 2023 (8 Pages).

* cited by examiner

*Primary Examiner* — Steven J Ganey
(74) *Attorney, Agent, or Firm* — Honigman, LLP; John Chau

(57) ABSTRACT

A manual activation system includes a pulley movable between an inactive position and an active position, a tension member wrapped about the pulley, the tension member having a tensile force acting on the pulley, and at least one arm rotatably mounted adjacent to the pulley. The at least one arm has a groove configured to cooperate with a portion of the pulley to selectively oppose the tensile force.

14 Claims, 6 Drawing Sheets

PULL STATION RELEASE MECHANISM

CROSS-REFERENCE TO RELATED APPLICATIONS

This application claims the benefit of U.S. Provisional Application No. 63/296,340 filed Jan. 4, 2022, the disclosure of which is incorporated herein by reference in its entirety.

BACKGROUND

Embodiments of the present disclosure relate to a system and method for delivering a fire suppression agent to a cooking appliance in the event of a fire, and more particularly to a manually operated pull station for delivering a fire suppression agent through an agent delivery path.

Manual activation systems used in fire suppression systems, such as cable pull stations, are typically simple mechanical mechanisms. Commonly, a pulley is mounted within a housing by a pin. To activate the fire suppression system, the pin is removed from the housing to release the tension in the cable wrapped about the pulley. However, because all of the tension from the cable is acting on the pulley, and therefore on the pin supporting the pulley, a large amount of force is required to remove the pin, making the system difficult for a user to operate.

BRIEF DESCRIPTION

According to an embodiment, a manual activation system includes a pulley movable between an inactive position and an active position, a tension member wrapped about the pulley, the tension member having a tensile force acting on the pulley, and at least one arm rotatably mounted adjacent to the pulley. The at least one arm has a groove configured to cooperate with a portion of the pulley to selectively oppose the tensile force.

In addition to one or more of the features described herein, or as an alternative, in further embodiments the pulley is rotatably mounted about a pin, and the groove is configured to cooperate with the pin to selectively oppose the tensile force.

In addition to one or more of the features described herein, or as an alternative, in further embodiments the at least one arm further comprises a first arm and a second arm arranged at opposite sides of the pulley.

In addition to one or more of the features described herein, or as an alternative, in further embodiments the first arm includes a first groove and the second arm includes a second groove, and the first groove and the second groove in combination cooperate with the pin to selectively oppose the tensile force.

In addition to one or more of the features described herein, or as an alternative, in further embodiments comprising another arm fixedly mounted adjacent to the pulley.

In addition to one or more of the features described herein, or as an alternative, in further embodiments the at least one arm has a first portion and a second portion, and the pulley is positioned between the first portion and the second portion.

In addition to one or more of the features described herein, or as an alternative, in further embodiments the at least one arm has a channel-like configuration.

In addition to one or more of the features described herein, or as an alternative, in further embodiments comprising an activation member operably coupled to the at least one arm when the pulley is in the inactive position.

In addition to one or more of the features described herein, or as an alternative, in further embodiments the activation member is arranged at a position offset from the pulley.

In addition to one or more of the features described herein, or as an alternative, in further embodiments comprising at least one biasing mechanism operably coupled to the at least one arm, the at least one biasing mechanism being configured to apply a biasing force to the at least one arm in a direction away from the pulley.

In addition to one or more of the features described herein, or as an alternative, in further embodiments the activation member opposes the biasing force of the at least one biasing mechanism.

In addition to one or more of the features described herein, or as an alternative, in further embodiments the groove further comprises a contoured surface, wherein the at least one arm is rotatable in a direction away from the pulley in response to application of the tensile force on the contoured surface.

In addition to one or more of the features described herein, or as an alternative, in further embodiments the tension member is operably coupled to an actuator or a control box of a fire suppression system.

According to an embodiment, a method of operating a manual activation system includes moving an activation member out of engagement with at least one arm. Moving the activation member out of engagement with the at least one arm enables (i) the at least one arm to rotate about an axis to decouple a pulley from the at least one arm and (ii) the pulley to move to an active position in response to a tensile force acting on the pulley by a tension member.

In addition to one or more of the features described herein, or as an alternative, in further embodiments the at least one arm further comprises a groove and a portion of the pulley is received within the groove.

In addition to one or more of the features described herein, or as an alternative, in further embodiments the portion of the pulley received within the groove is a pin.

In addition to one or more of the features described herein, or as an alternative, in further embodiments rotation of the at least one arm about the axis occurs at least partially in response to the tensile force acting on the pulley.

In addition to one or more of the features described herein, or as an alternative, in further embodiments the rotation of the at least one arm about the axis occurs via a biasing mechanism.

In addition to one or more of the features described herein, or as an alternative, in further embodiments moving the activation member further comprises moving the activation member laterally out of a plane of rotation of the at least one arm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
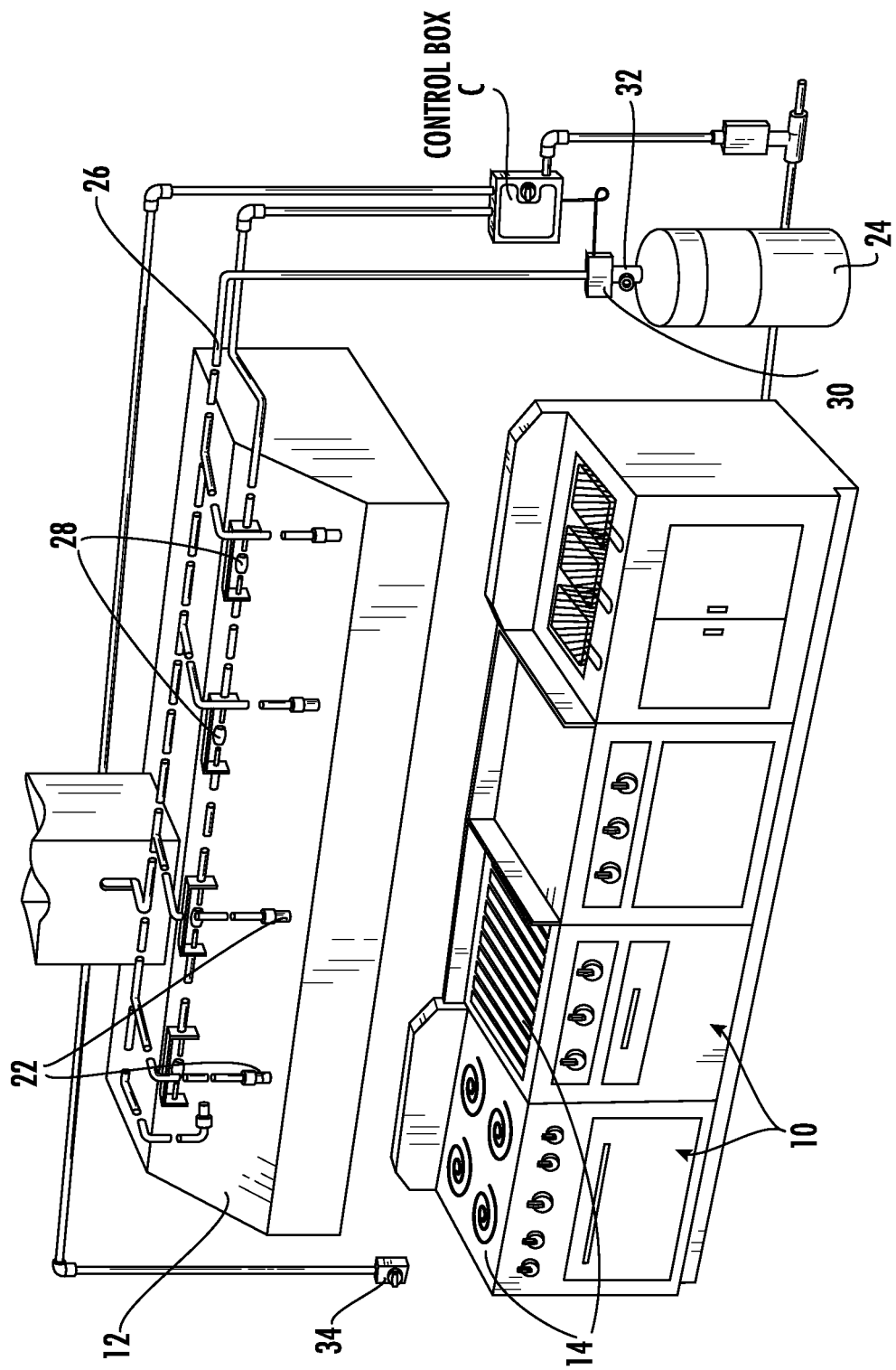
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of a self-contained pressure vessel. In embodiments including a plurality of cooking appliances 10, one or more spray nozzles 22 may be dedicated to each cooking appliance 10, or alternatively, one or more evenly spaced spray nozzles 22 may be used for all of the cooking appliances 10. The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to detecting heat or smoke exceeding an allowable limit, a control box C will direct a signal to an actuator 30 to open a valve 32 to allow the fire suppression agent to flow from the source 24 to the nozzles 22. Alternatively, or in addition, the fire suppression system 20 includes a manual activation system 34, also referred to herein as a pull station, configured to actuate the control box C to activate the valve 32 to initiate operation of the fire suppression system 20.

With reference now to FIGS. 2-5, an example of a manual activation system 34 is illustrated in more detail. The manual activation system 34 includes a pulley 40 rotatably mounted to pin 42. A tension member 44, such as a rope or cable, for example, is wrapped about a portion of the pulley 40 and is operably coupled to the control box C of the fire suppression system 20. However, it should be understood that embodiments where the tension member 44 is operably coupled directly to the actuator 30 are also within the scope of the disclosure.

Figure 2:
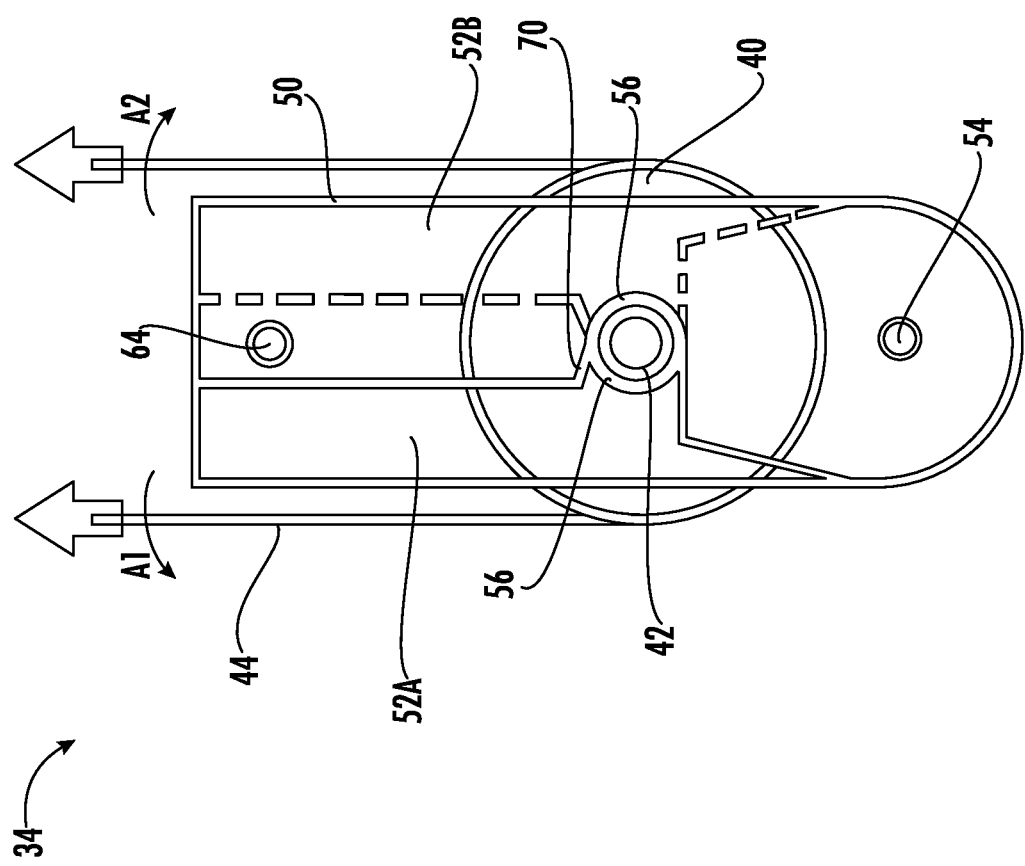
FIG. 2 is a front view of an exemplary manual activation system in an inactive position according to an embodiment.
Figure 4:
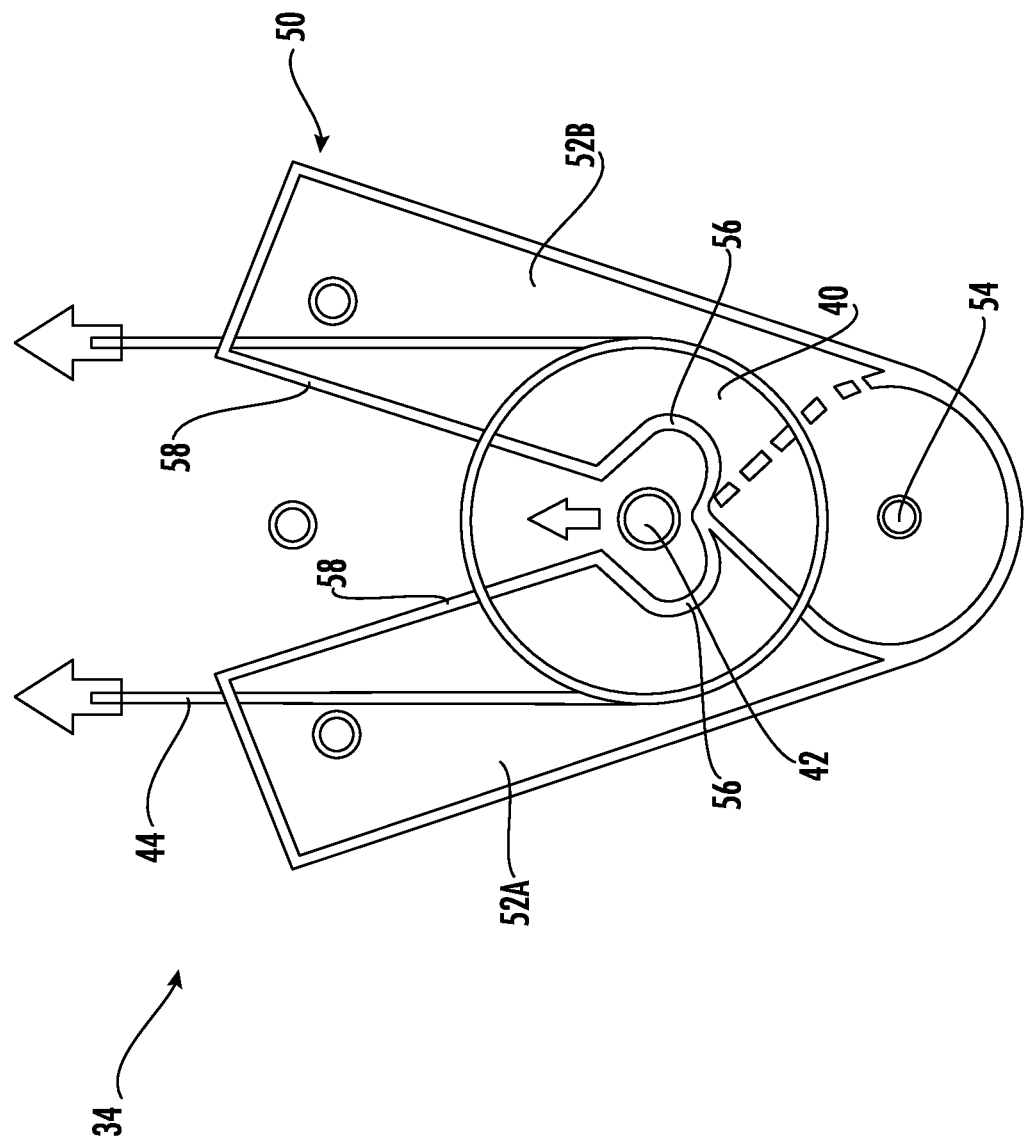
FIG. 4 is a front view of the manual activation system of FIG. 2 in an active position according to an embodiment.
Figure 5B:
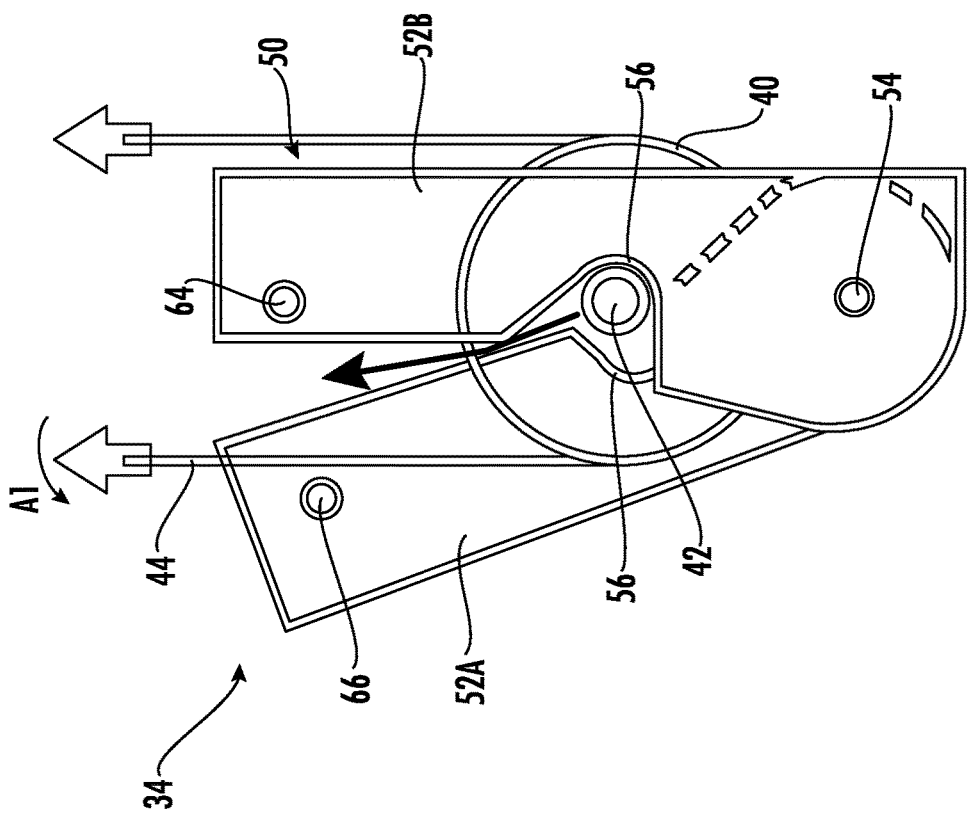
FIG. 5B is a front view of the manual activation system of FIG. 5A in an active position according to an embodiment.
Figure 5A:
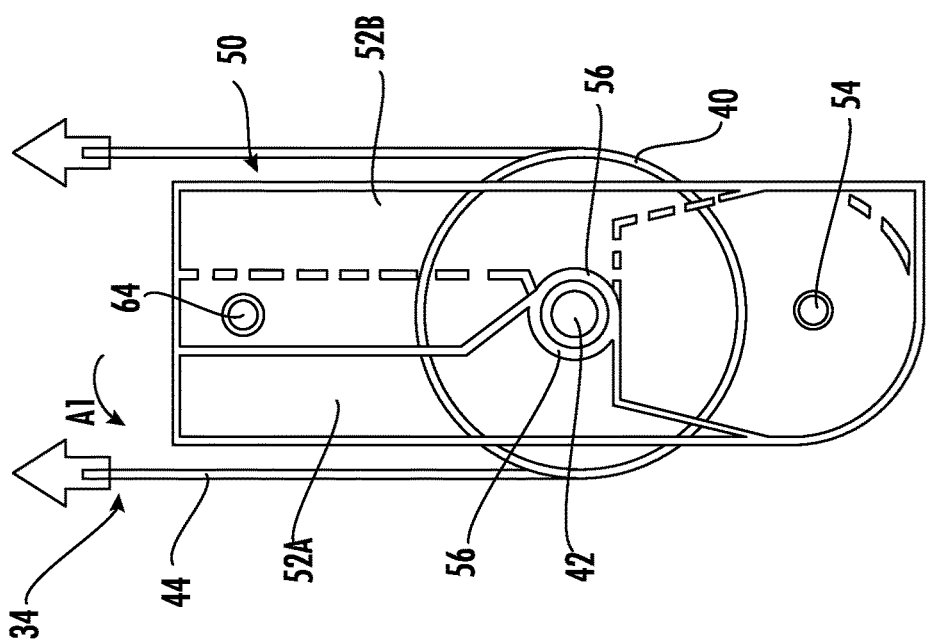
FIG. 5A is a front view of another exemplary manual activation system in an inactive position according to an embodiment.

The pulley 40 is movable between an inactive position (FIG. 2) and an active position (FIG. 4). In the inactive position, as shown in FIG. 2, the tension member 44 applies a force (e.g., tension) on the control box C for the fire suppression system 20 to be in an inactive state. When the pulley 40 transforms to an active position, such as by moving vertically for example, this tension within the cable 44, and therefore the force applied in the control box C is reduced. In response, the control box C will transmit a signal to the actuator 30 to activate the fire suppression system 20. The type of signal transmitted to the actuator 30 may depend on what components within the control box C have been activated. In an embodiment, the reduced tension in the tension member 44 may also be an output of the control box C provided to a downstream component.

The manual activation system 34 additionally includes a mechanical assembly 50 movable between an inactive position and an active position. When in the inactive position, the mechanical assembly 50 is configured to maintain the pulley 40 in an inactive position. The mechanical assembly 50 includes at least one arm or jaw 52 mounted via a shaft 54. The at least one arm 52 is operably coupled to the pulley 40 to selectively oppose the tensile force acting on the pulley 40. Although the non-limiting embodiment of a mechanical assembly 50 shown in FIGS. 2-4 includes a plurality of arms 52, such as two arms for example, embodiments having a single arm, or more than two arms are contemplated herein. Although the first arm 52a and the second arm 52b are illustrated as being substantially identical but mounted as mirror images of one another, embodiments where the first arm 52a and the second arm 52b have different configurations are also within the scope of the disclosure.

In the illustrated, non-limiting embodiment, one or more of the arms 52 is pivotally or rotatably mounted via the shaft 54. The at least one movable arm 52 may be configured to rotate relative to the shaft 54, or alternatively, the at least one arm 52 may be fixedly mounted to the shaft 54 and the shaft may be rotatably mounted. In an embodiment, best shown in FIGS. 5 and 6, the first arm 52a is rotatable about an axis and the second arm 52b is fixedly mounted, such that the first arm 52a moves relative to the second arm 52b. In another embodiment, shown in FIGS. 2-4, both the first arm 52a and the second arm 52b are rotatable. In embodiments where both the first arm 52a and the second arm 52b are configured to rotate, the first and second arm 52a, 52b may be rotatable about the same axis. In such embodiments, the first arm 52a and the second arm 52b may be mounted about and rotatable relative to a single shaft 54. Alternatively, the first arm 52a and the second arm 52b may be configured to rotate about separate axes. In such embodiments, the first arm 52a is rotatable about a first axis via a first shaft and the second arm 52b is rotatable about a second axis via a second shaft, the first shaft and the second shaft being spaced from one another, such as within a horizontal plane for example.

In an embodiment, at least one arm 52 has a groove 56 formed at a side 58 thereof. The groove 56 is sized to receive the pin 42 supporting the pulley 40 therein, such as when the mechanical assembly 50 is in the inactive position. In the illustrated, non-limiting embodiment of FIGS. 2-6, regardless of whether one or both arms 52a, 52b are configured to move, both the first arm 52a and the second arm 52b have a groove 56 formed therein, the groove 56 being formed in the side 58 of each arm 52a, 52b facing the other arm. However, it should be understood that in other embodiments, only one of the arms 52a, 52b may have a groove 56 therein. These grooves 56 cooperate to surround and retain the pin 42, thereby restricting movement of the pulley 40. Accordingly, when the mechanical assembly 50 is in the inactive position, the at least one arm 52 is configured to oppose the tensile force acting on the pulley 40 by the tension member 44.

Figure 3:
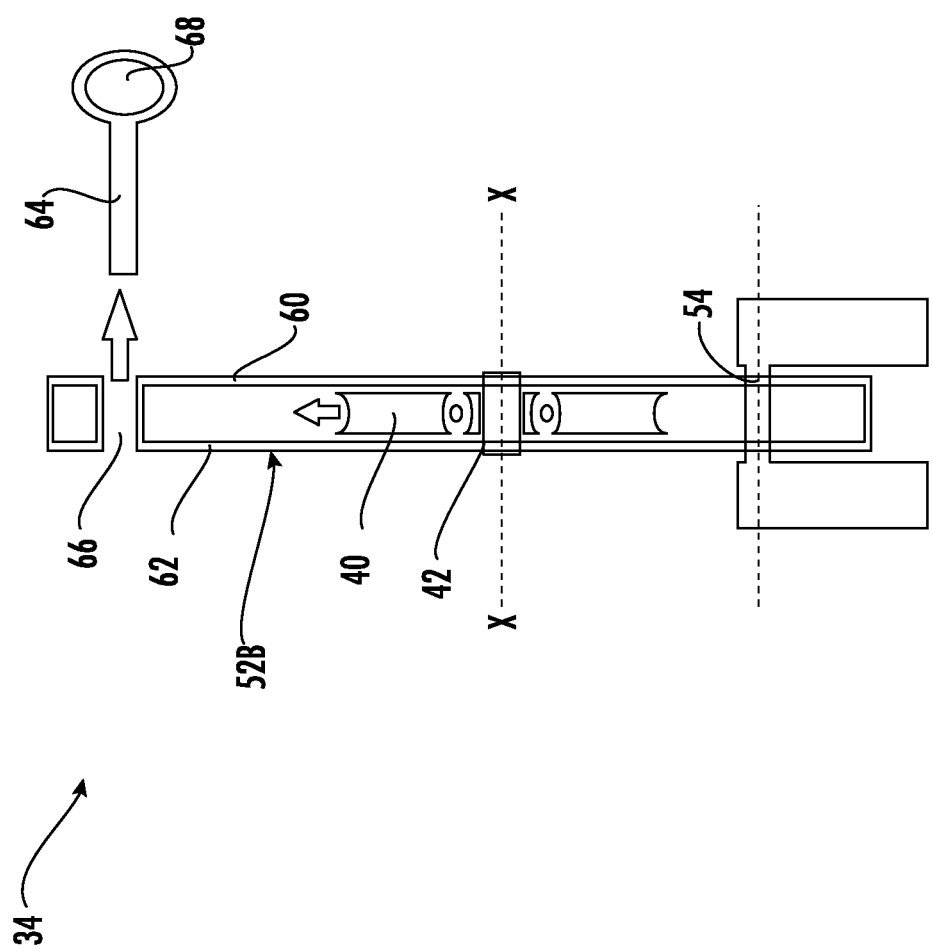
FIG. 3 is a cross-sectional view of the manual activation system of FIG. 2 according to an embodiment.

In an embodiment, one or more of the plurality of arms 52a, 52b has a generally planar configuration, for example formed by a piece of sheet metal. In such embodiments, the at least one arm 52 is positioned adjacent to an end of the pulley 40, and the plane of the arm 52 extends perpendicular to the rotational axis X of the pulley 40. In another embodiment, best shown in FIG. 3, each arm 52a, 52b may include a first portion 60 arranged adjacent to a first end of the pulley 40 and a second portion 62 arranged adjacent to a second, opposite end of the pulley 40. The first portion 60 and the second portion 62 of each arm 52a, 52b may be substantially identical in configuration. Further, in embodiments where the arm 52 is rotatable, the first portion 60 and the second portion 62 of each arm 52 are mounted to the same shaft 54 and are configured to rotate in unison. In such embodiments, the first portion 60 and the second portion 62 may be connected to one another. For example, as shown in FIG. 3, each arm 52a, 52b may have a channel-like configuration with a portion of the pulley 40 arranged within the interior of the channel. However, embodiments where the first portion 60 and the second portion 62 are not connected to one another are also contemplated herein.

An activation member 64 is configured to cooperate with one or more of the arms 52 at a position offset from the pulley 40, to maintain the tension acting on the pulley 40. In the illustrated, non-limiting embodiment of FIGS. 2-5B, each of the first arm 52a and the second arm 52b has an opening or through hole 66 formed therein. When the arms 52a, 52b are in the inactive position, the arms 52a, 52b these openings 66 are in overlapping arrangement with one another. Accordingly, the activation member 64, such as a pin for example, is insertable through the aligned openings 66 of the plurality of arms 52a, 52b to prevent relative movement between the arms 52a, 52b. In other embodiments, the activation member 64 may be a U-shaped or C-shaped channel having two sides extending parallel to one another. When installed relative to the arms 52a, 52b, the two sides of the activation member 64 are positioned directly adjacent to, and in some embodiments may be in contact with, at least one of the first arm 52a and the second arm 52b. Such an activation member 64 similarly prevents relative movement of the arms 52a, 52b by restricting rotation of the at least one movable arm.

Figure 6B:
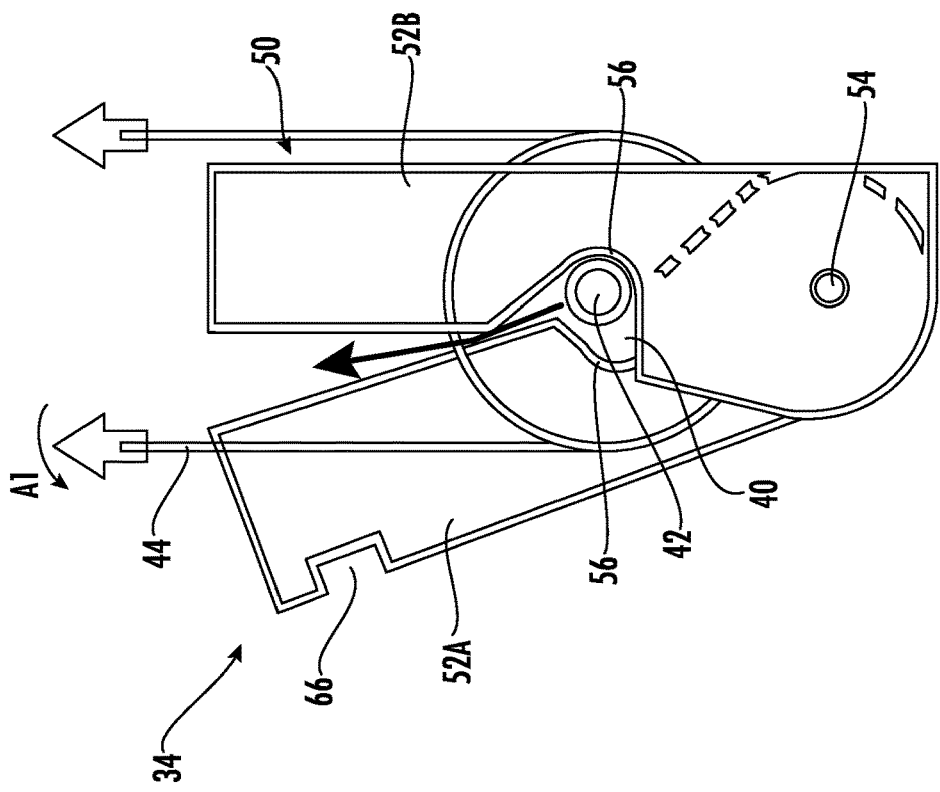
FIG. 6B is a front view of the manual activation system of FIG. 6A in an active position according to an embodiment.
Figure 6A:
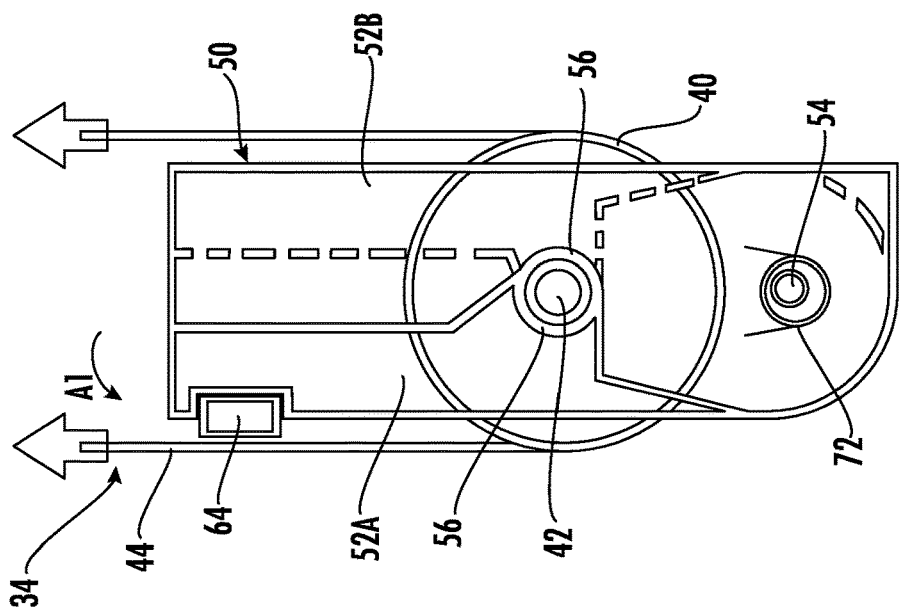
FIG. 6A is a front view of another exemplary manual activation system in an inactive position according to an embodiment.

In embodiments where the mechanical assembly 50 includes only one movable arm, such as in FIGS. 6A and 6B, the activation member 64 may be associated with only the movable arm 52a. As shown, an opening 66 may be formed in the movable arm, such as arm 52a for example, and the activation member 64 is receivable within the opening 66 to restrict rotation thereof. The opening may be arranged at any portion of the arm 52a, such as at a central portion thereof, or at a side thereof (as shown). In other embodiments, the activation member 64 may be positionable remote from the movable arm, but in the path of movement thereof. It should be understood that an activation member 64 having any suitable configuration that is at least partially arranged within the path of rotation of the at least one movable arm is contemplated herein.

To operate the manual activation system 34, a user moves the activation member 64 out of engagement with the at least one arm 52. This movement away from the remainder of the mechanical assembly 50 transforms the manual activation system 34 from an inactive position to an active position. In an embodiment, the activation member 64 is moved laterally (see FIG. 3), out of the plane of rotation of the at least one movable arm 52. The activation member 64 may have a handle or other feature 68 to facilitate a user's manipulation of the activation member 64. Upon removing the activation member 64, the tension acting on the pulley 40 will cause the at least one movable arm 52 to rotate out of the path of movement of the pulley 40. In an embodiment, the groove 56 of the at least one movable arm includes a contoured surface 70. As shown, the contoured surface 70 may be angled or sloped to facilitate rotation of the arm, in a direction indicated by arrow A, out of the path of movement of the pulley 40 when the tensile force of the pulley is applied thereto. Without the grooves 56 in the arms 52a, 52b opposing the tensile force of the tension member 44, the pulley is free to move from the inactive position to the active position, thereby sending a signal to the control box C via a lack of cable tension.

In an embodiment, best shown in FIG. 6A, at least one biasing mechanism 72, such as a torsion spring for example, is operably coupled to the at least one movable arm 52. In embodiments where both the first arm 52a and the second arm 52b are configured to rotate, the biasing mechanism 72 may be associated with only one of the arms, or alternatively, with both of the arms. In embodiments where a respective biasing mechanism 72 is associated with the first arm 52a and the second arm 52b, the first and second arm 52a, 52b are biased in opposite directions, respectively. In an embodiment, the biasing force of the biasing mechanism 72 is configured to rotate the at least one arm 52 in a direction of arrow A, out of the path of movement of the pulley 40. Accordingly, the activation member 64 may be configured to oppose the bias of the biasing mechanism 72 to retain the one or more arms 52 in an inactive position.

By retaining the pulley 40 in the inactive position via the mechanical assembly 50, the manual activation system 34 as illustrated and described herein does not require a user to move a component to which the tensile force of the tension member is applied. Accordingly, the force required to activate the activation system 34 by a user is limited allowing the system to be properly actuated by users of varying strengths.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A manual activation system comprising:
    a pulley movable between an inactive position and an active position, the pulley rotatably mounted about a pin;
    a tension member wrapped about the pulley, the tension member having a tensile force acting on the pulley;
    a first arm and a second arm disposed on opposite sides of the pulley and rotatably attached to each other, wherein at least one of the first arm and the second arm has a groove configured to cooperate with the pin to selectively oppose the tensile force.

2. The manual activation system of claim 1, wherein the groove is disposed on both of the first arm and the second arm, and the grooves in combination cooperate with the pin to selectively oppose the tensile force.

3. The manual activation system of claim 1, wherein each of the first arm and the second arm has a first portion and a second portion, and the pulley is positioned between the first portion and the second portion.

4. The manual activation system of claim 3, wherein each of the first arm and the second arm has a channel-like configuration.

5. The manual activation system of claim 1, further comprising an activation member operably coupled to the at least one of the first arm and the second arm when the pulley is in the inactive position.

6. The manual activation system of claim 5, wherein the activation member is arranged at a position offset from the pulley.

7. The manual activation system of claim 5, further comprising at least one biasing mechanism operably coupled to one of the first arm and the second arm, the at least one biasing mechanism being configured to apply a biasing force to one of the first arm and the second arm in a direction away from the pulley.

8. The manual activation system of claim 7, wherein the activation member opposes the biasing force of the at least one biasing mechanism.

9. The manual activation system of claim 1, wherein the groove further comprises a contoured surface, wherein at least one of the first arm and the second arm is rotatable in a direction away from the pulley in response to application of the tensile force on the contoured surface.

10. The manual activation system of claim 1, wherein the tension member is operably coupled to an actuator or a control box of a fire suppression system.

11. A method of operating a manual activation system comprising:
    moving an activation member out of engagement with a first arm rotatably coupled to a second arm, wherein the first arm and the second arm are disposed on opposite sides of a pulley rotatable about a pin, the first arm and the second arm rotatably attached to each other, the first arm includes a groove configured to cooperate with the pin, and wherein moving the activation member out of engagement with the first arm enables:
    (i) the first arm to rotate about an axis to decouple the pulley from the first arm; and
    (ii) the pulley to move to an active position in response to a tensile force acting on the pulley by a tension member.

12. The method of claim 11, wherein rotation at least one of the first arm and the second arm about the axis occurs at least partially in response to the tensile force acting on the pulley.

13. The method of claim 12, wherein the rotation at least one of the first arm and the second arm about the axis occurs via a biasing mechanism.

14. The method of claim 11, wherein moving the activation member further comprises moving the activation member laterally out of a plane of rotation at least one of the first arm and the second arm.

* * * * *